Figure 1:
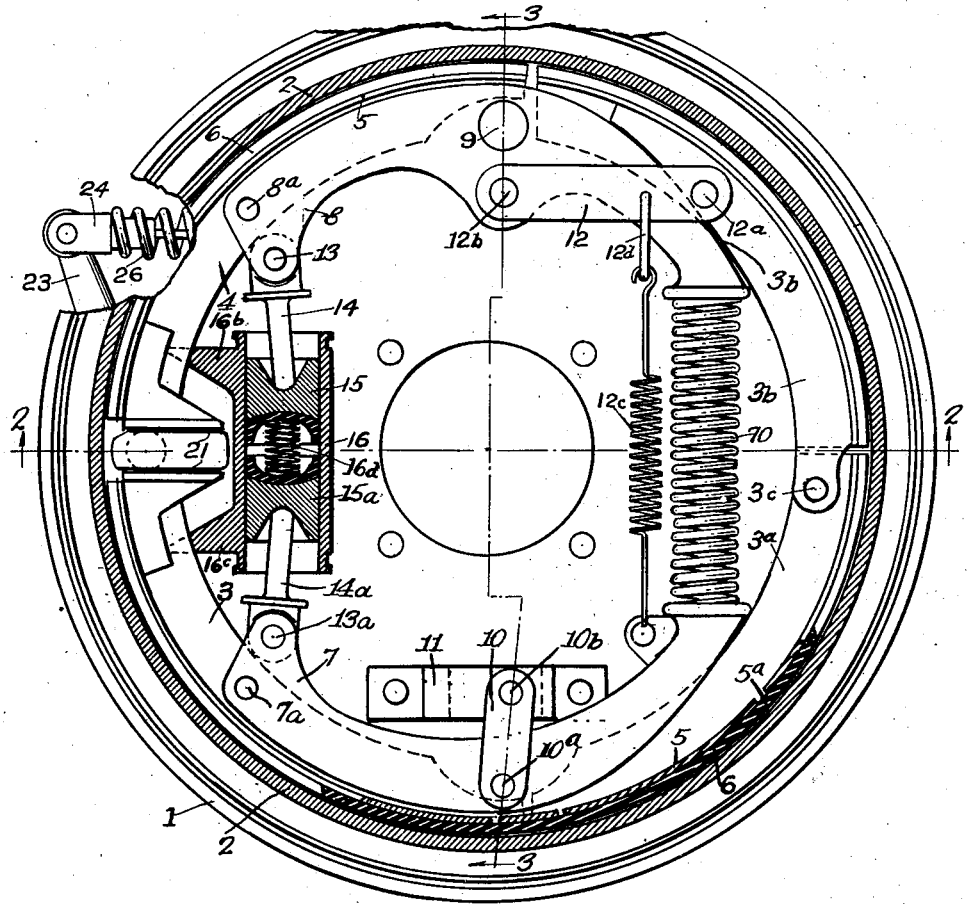

John EUGENE WALLACE
INVENTOR.

BY *Francis V. McCarty*

ATTORNEY.

June 6, 1939.     J. E. WALLACE     2,161,493
BRAKING SYSTEM FOR MOTOR VEHICLES
Filed June 27, 1936     3 Sheets-Sheet 2

John EUGENE WALLACE
INVENTOR.

BY Francis V. McCarthy
ATTORNEY.

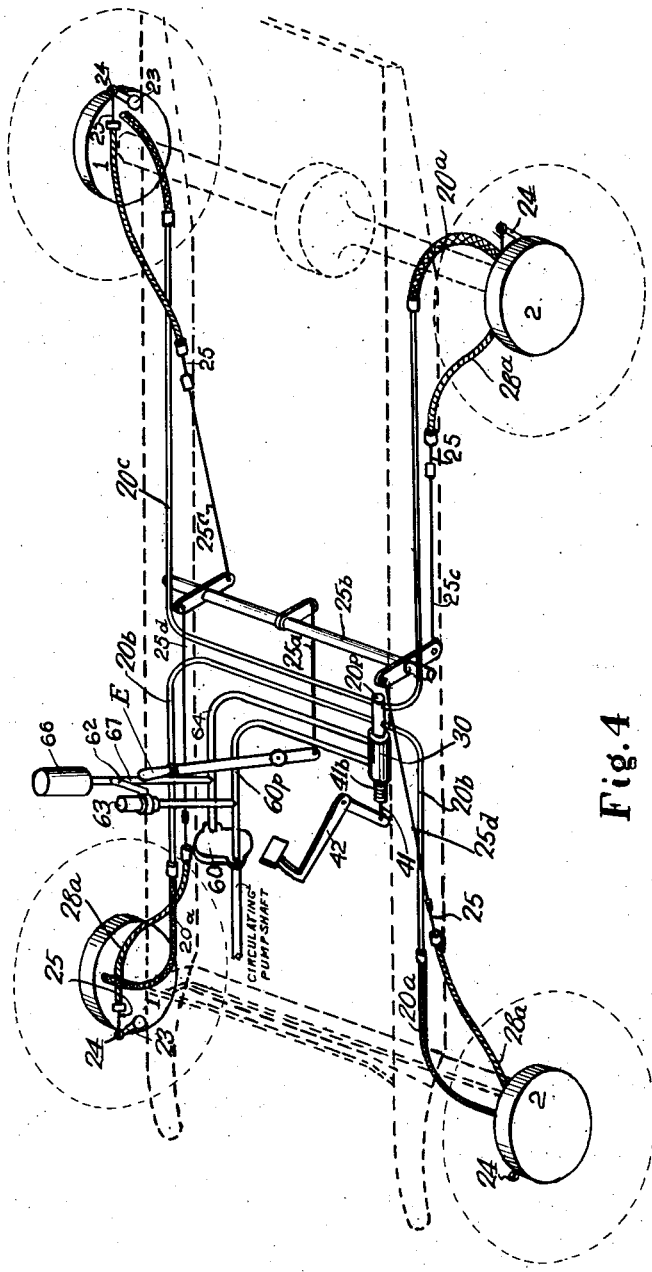

Patented June 6, 1939

2,161,493

UNITED STATES PATENT OFFICE 2,161,493

BRAKING SYSTEM FOR MOTOR VEHICLES

John Eugene Wallace, Foxboro, Mass.

Application June 27, 1936, Serial No. 87,752

13 Claims. (Cl. 188—106)

My present invention pertains to wheel brake mechanisms for retarding the speed of and stopping motor vehicles and has for a principal object the elimination of road hazards caused by willful or ignorant failure of careless drivers to voluntarily keep the brakes of their cars in proper order. Such an object can be attained by providing brakes that will function effectively for a period of time which will allow efficient official inspection and by providing means enabling easy official inspection. This object is attained by my invention.

My invention comprises a braking system capable of functioning at maximum effectiveness for one year of constant use by drivers who give little thought to the condition of their car brakes and there are many drivers of that class. The experience of traffic officials discloses many such drivers and they are frequently very hard on brakes and given to taking chances with faulty brakes. Brakes that will function effectively over long periods of time and be easy to inspect make official inspections by the State, where required, thoroughly effective for the elimination of the hazard of faulty brakes, the cause of many accidents on the public highways. If official inspection were not required, the service brakes feature of the braking action would function effectively for a short time after a stop means had acted to prevent functioning of the emergency braking feature of the braking action. Not having proper emergency brakes, their use for parking purposes would make parking difficult and at times dangerous. It is contrary to law to leave a car standing on the public highway without brakes set to hold the car from moving and such a car would soon attract the attention of the police on a city street. It would be dangerous anywhere. If a driver continued to use a car so equipped, the fact that the service brakes were likely to go faulty at any moment would put the driver under a nervous strain tending to create a desire to have the brakes made right with new brake linings before something serious might happen.

To accomplish the purposes above set forth I provide wheel brake mechanisms whereby two methods of actuating the brakes are used, each method being independent of the other from the driver's seat to the brake shoes and both acting on the same brake shoes. As will appear hereinafter, service application of brakes as controlled by the brake pedal is brought about by pump created sustained fluid pressures admitted into the brake cylinders for actuating the brakes, the fluid pressure equalizing at all wheels to effect straight line braking without tendency to swerve or skid. Emergency braking is brought into action through the use of the emergency brake lever, which, through mechanical linkages, motivates the brake cams to impel the brake shoes into contact with the brake drums for braking action. Both combinations act on the same brake shoes in the wheel brake mechanisms. The advantage gained is that a measure of brake lining wear from service braking by fluid pressure is available at all times and no adjustments are necessary during the life of a set of brake linings. No means are provided for making adjustments. The linkages between the emergency brake lever and the cams at all of the wheels are permanently adjusted so that maximum movement of the brake shoes, by reason of maximum permissible wear of the brake linings, coincides with maximum movement of the emergency brake lever. Therefore, an operator, through the use of the emergency brake, is constantly informed of the approach of the time when the brake linings must be renewed. My braking system thus provides means by which State authorized inspections are greatly facilitated, because, at any time, in any place, an inspector or an officer is able to determine the safe condition of the brakes by simply pulling the emergency brake lever. If upon such inspection the lever moves to the extreme limit the brake linings should be renewed forthwith. If the lever refuses to move to the extreme limit the percentage of movement divided into the correct mileage registered on the speedometer of the motor vehicle will indicate the mileage at which new brake linings will have to be installed. Record of such milage should be made by the inspector and placed in the car where it will at all times be in sight of the driver or any other inspector or persons. To ascertain if brake lining wear is the same at all wheels the emergency brakes should be set reasonably tight, after which the inspector will apply manual pressure to the cam arms in the direction to apply brakes at each wheel. If all cam arms are found tight to the same degree the wear of brake linings is uniform.

To accomplish all these things, it is obvious that four wheel brakes, as stated above, are necessary and it is equally obvious that if brake shoe mechanisms are adaptable for use with front wheels where the clearance between the back plates and brake drums is limited by reason of the necessary contours of the back plate, as later will appear, that the same brake shoe mechanisms will readily be workable at rear wheels where always there is much more clearance, therefore, the drawings illustrate a front wheel brake mechanism.

Cooperatively, my wheel brake mechanisms will function effectively through the periods between official State inspections, and thus the carelessness of many drivers is neutralized. One full year of operation at maximum efficiency will enable semi-annual official inspections to be accomplished to an effective degree, and to that end I provide full circle brake linings, subjected to even wear, with resultant reduced frictional pressure per unit of area that results in long life service. Used cooperatively with my system of brake control, as described in my pending application, Serial Number 698,672, filed November 18, 1933, in which engine power develops the pressure to actuate the brakes, no adjustments to compensate for brake lining wear are necessary because the unlimited follow up of the pressure created by the engine driven pump will force the brake shoes against the brake drums, for efficient braking action, to the extreme limit of the brake lining wear and the travel of the emergency brake lever, as limited by a stop means in the wheel brake mechanisms, will give the measure of safe permissible wear. If the brake shoes are worn further by service braking the emergency braking action, as limited by the above mentioned stop means, will refuse to function. Such a combination presents a braking system that, as stated, is capable of functioning at maximum efficiency for one full year of constant driving without adjustments of any kind being necessary.

Brake mechanisms of self energizing character reduce the pressure required to be produced either manually or by engine power for any given brake action. Reduced fluid pressures are conducive of fewer leaks—the hidden peril of fluid actuated braking systems. Leaks, unless discovered and eliminated, lead to brake failures, sometimes at critical moments, and any feature that will minimize the occurrence of leaks will add to the reliability of a highly desirable system of brake actuation. The question of leaks is more fully treated in my pending application, as previously mentioned, in which it will appear that leaks that would instantly incapacitate ordinary fluid actuated braking systems, or hydraulic brakes, would not be apparent until attention was directed to the fact that leakage was taking place. The brakes would function quite as though nothing was wrong.

Figure 2:
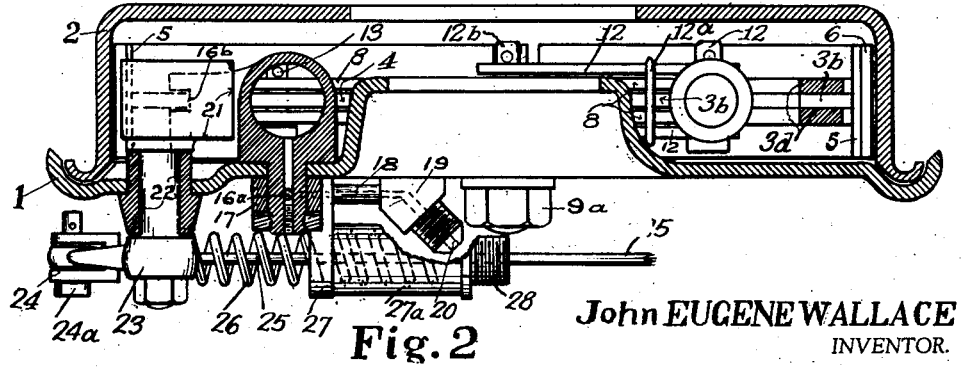
Figure 6:
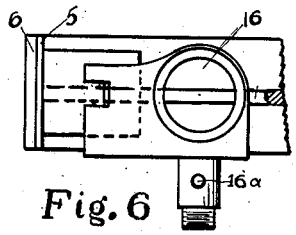
Figure 5:
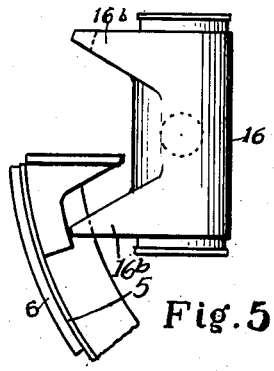
Figure 7:
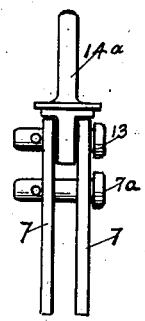
Figure 3:
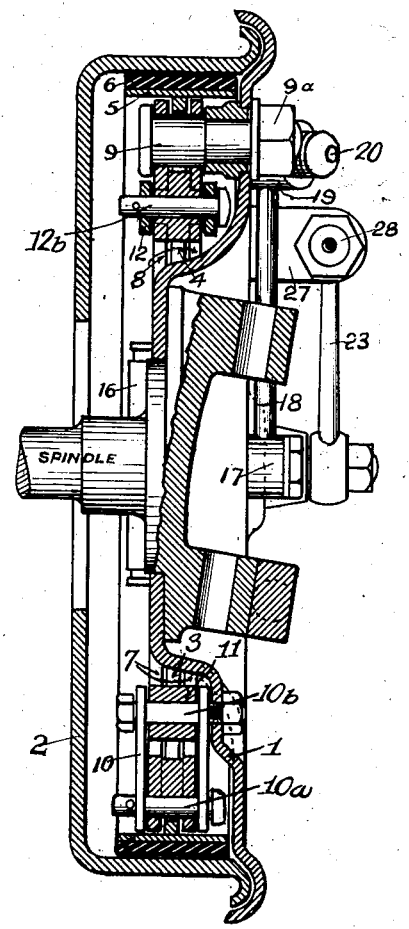

In the accompanying drawings, in which are shown illustrative mechanisms and such as by modification may be made to meet different conditions and to accomplish the spirit of my invention. Figure 1 is a frontal section through the brake drum of a left hand front wheel and exposing the brake mechanisms with the brake cylinder sectioned longitudinally at the center of the bore, also showing a partial section of the brake shoes and brake linings; Figure 2 is a horizontal section through the center of the mechanisms on the line 2—2 of Fig. 1 and showing the location of the brake cylinder; Figure 3 is a vertical section on the line 3—3 of Fig. 1 to show the anchorages of the mechanisms to the brake housing; and Figure 4 is an isometric view showing the emergency brake lever carried on the chassis for mechanically actuating the brake shoes at all four wheels and showing the piping system for fluid pressure actuation of the brakes at all four wheels; Figure 5 is a view of the brake cylinder and integral rest bosses supporting the brake shoes; Figure 6 is an end view of the brake cylinder showing the slots in the rest bosses; and Figure 7 is a side view of the pivoting of the thrust rod to the brake shoe lever.

The brake shoes shown are T-shaped constructions and may be formed from T-section bars obtained from rolling mills. They are shown in the drawings as fabricated by attaching web stiffeners to thin band steel, the latter constituting the brake shoes proper, to which are attached brake lining material of the usual character. The web stiffeners are numbered to indicate various sections of the brake shoes proper.

Referring to the drawings, 1 indicates the concaved back plates or brake housings mounted on the axles supporting the chassis of a motor vehicle, as indicated at Figure 4. Strength of construction and economy of maintenance require at the front wheels the least possible distance between the pivoting of the front wheel spindle to the front axle and the mounting of the wheel on the spindle, which means that the back plate must be concaved as shown in Figures 2 and 3. 2 indicates the brake drums attached to the wheels of the motor vehicle and subjected to frictional pressure from brake shoes attached to the brake housing 1. The main brake shoe comprises three parts, the primary section 3, the intermediate section 3a and the stationary section 3b, this sequence constituting substantially three-fourths of the braking surface provided for contacting the brake drums. As shown in Figure 1, each shoe section is stiffened by a web plate substantially one-fourth circumference in length. The brake shoe proper is thin flexible steel which provides flexible continuity between the primary section 3 and the intermediate section 3a. The stationary section 3b is flexibly attached to the intermediate section 3a by means of the pin 3c, as shown in Figure 1. The strut 12 is flexibly attached to the web of the stationary section 3b by the pin 12a and provides means to anchor the stationary section relative to the brake housing 1 and to increase braking action as will be described hereinafter. The secondary brake shoe 4 is stiffened by a web plate of the same pattern used with the primary section 3. The brake shoes proper 5 are thin bands of steel fitting over projections, as indicated at 5a (Figure 1) from the web plate for anchorage and further affixed to the web plates by spot welding. It will be apparent that the flexibility between the three parts of the main brake shoes enables the latter to conform to the circularity of the brake drums 2 as the brake linings 6 wear thin from use. The result is evenly applied pressure over the full sequence of the main brake shoes, leading to full utilization of the material in the brake linings 6 from end to end. The secondary brake shoe 4 being substantially a quarter circle in length similarly makes full use of brake lining material. The fulcrum pin 10a movably attaches the main brake shoe lever 7 to the links 10, which latter pivot on the link bolt 10b (Figure 3) threaded into the brake housing 1 and held vertical relative to the housing by the bracket 11 affixed rigidly to the housing. The links 10 permit the main brake shoe lever 7 to move in a rotative direction relative to the housing 1 as urged to such movement by the frictional drag of the rotating brake drum 2 acting on the main brake shoe sequence as attached to the main brake shoe lever 7 by the pin 7a. Radial pressure by the brake shoes against the rotating brake drum develops frictional drag, a synonymous term for braking action or braking drag. Frictional pressure, or drag, is always accompanied by tangential pressure. The two pressures are complementary and tangential pressure must be resisted by attachment of the brake shoes to the brake housing, otherwise no braking action takes place. Pressure exerted on the primary section 3, as will be described later, causes frictional drag to develop tangential pressure acting through the intermediate section 3a to meet tangential resistance from the flexibly anchored stationary section 3b. The angles of the opposing forces react against the intermediate section 3a to develop radial pressure against the brake drums 2, which in turn increases the frictional drag on the intermediate section 3a to develop greater tangential pressure against the stationary section 3b. The tangential pressure of the stationary section 3b, as augmented through the sequence from the primary section 3, in the manner described, is resisted by the strut 12, which latter converts the tangential pressure into two component pressures, one acting against the anchorage of the strut and the other acting radially against the brake drum to develop additional braking action. This brake shoe action constitutes self energization and reduces the pressure that must be exerted, in this case against the primary section 3, to obtain any given braking action. The secondary brake shoe lever 8 is fulcrumed on the anchor bolt 9 for anchorage to the brake housing 1 and provides through pin 8a attachment for the secondary brake shoe 4, as shown in Figure 1. The nut 9a firmly fixes the anchor bolt 9 in the brake housing 1. The brake shoe levers are made of two plates spaced apart to permit functioning on each side of the webs of the brake shoes. The secondary brake shoe lever 8 provides a rest for the stationary section 3b of the main brake shoe. Each side of the stiffener web of the stationary section 3b being provided with seats 3d, extended to lap over the web of the intermediate section 3a for the purpose of providing lugs attached to the intermediate section 3a. The pin 3c is provided to facilitate removal of the brake shoes when new brake linings are necessary. In normal release position the stationary section assembly, attached to the strut 12 by the pivot pin 12a, rests on the secondary brake shoe lever 8 drawn to anti-rattling contact by the tension of the spring 12c attached to the strut 12 by means of the yoke 12d, the other end being attached to the brake shoe lever 7, as shown. By means of the pivot pin 12b, the strut 12 is anchored to a lug integral with the secondary brake shoe lever 8 so arranged (Figure 1) that the complementary component pressure from the stationary section 3b transmitted through the strut 12 by reason of the tangential action, as has been described, acts on the brake shoe lever 8 and the attached secondary brake shoe 4 (Figure 1) to increase braking pressure on the brake drum and thereby increases self energization.

To achieve the objects set forth in the preamble of this specification, cylinders having therein pistons must be provided to obtain equalized action at all wheels, sometimes called straight line action. Cams must also be provided to obtain a measure of brake lining wear and the brake shoes must function without adjustments from no wear to full permissible wear, which precludes wearing through the material of the brake lining to the iron of the brake shoe supporting the brake lining. Cooperative action for such results without complicated constructions require that the cams and cylinders be adjacent to each other and attached to the concaved back plates of front wheel brakes between the ends of the brake shoes as shown in Figure 1. Such construction precludes the use of ordinary tension release springs between the ends of the brake shoes for the obvious reason that the cams and cylinders occupy all the space between the brake drums and the outside contours of the concave of the back plates. Therefore, other means must be adopted as later described to draw the brake shoes to release position away from contact with the brake drums.

The thrust rods 14 and 14a are pivoted, as shown in Fig. 7, to their respective brake shoe levers 8 and 7 independent of attachments to the brake shoes to facilitate removal of the brake shoes when new brake linings are necessary. The thrust rods receive impulse from the pistons 15 and 15a in the cylinder 16 and transmit pressure to the brake shoe levers to impel the attached brake shoes into action against the brake drums. Each piston is equipped with cup packing to maintain tight sliding closure and a spring 16d between the two piston assemblies acts to keep them properly positioned against the thrust rods when there is no pressure in the cylinder. The cylinder is provided with rest bosses 16b and 16c, notched, as indicated by the dotted lines in Figure 2 and further indicated by Figures 5 and 6, to act as rests and guides for the primary section 3 of the main brake shoe and for the secondary brake shoe 4, the ends of each section adjacent to the cam 21 resting on the bosses and the opposite ends resting respectively on the fulcrum pin 10a and the anchor bolt 9. The release spring 10 in compression between the ends of the brake shoe levers 7 and 8 opposite the attachments to the brake shoes, as shown in Figure 1, acts to draw the brake shoes to the positions of rest as just stated. The cylinder port 16a is in juxtaposition with a passage through the side of the connecting ring 17 communicating into the pipe 18 and therethrough to the union terminal 19, to communicate into the hose port 20 therein. The union terminal is fixedly supported by the brake housing 1 and is provided with threading for attachment of the flexible hose 20a communicating into the hose port 20, as indicated in Figure 4.

The cams 21, located between the primary sections 3 and the secondary brake shoes 4, are integral with the cam shafts 22 reaching through the brake housings 1 for attachment of the cam arms 23. The yokes 24, movably attaching to the cam arms by means of the pins 24a, are affixed to the cables 25, which latter extend from the yokes 24 to means supported on the chassis for creating tension in the cables 25 to cause rotative movement of the cams 21 for motivating the brake shoes. The cable springs 26 surround the cables in the manner shown in Figure 2 and act to keep the cams 21 in proper release position. A boss 27 supported by the brake housing 1 provides a stop against which the yoke 24 impinges to limit the movement of the cam arm 23 and attached cam 21 to actuation of the brake shoes within permissible limits of wear and the boss also carries a terminal tube 27a, the latter supporting the connector 28 and the connector in turn acts as a stop against which spring 26 reacts. Each brake housing 1 is similarly equipped with a boss 27. The connectors 28, one on each brake housing 1, have a central passageway for the cables 25, as shown in Figure 2 and are threaded for attachment of carrier tubes 28a, as shown in Figure 4. The carrier tubes are flexible laterally but inflexible longitudinally and function to provide a fixed distance of various curvatures from their attachment to the connectors 28 to their attachment to the chassis. More slack is required in attachment to the connectors 28 of the front wheels to enable the carrier tubes 28a to accommodate themselves to the various positions that the front wheels may take in the process of guiding the movements of the motor vehicle. Since the cables 25 pass through the carrier tubes 28a to find means supported on the chassis for creating tension, as described, there is consequently always a fixed distance, regardless of the position of the wheels, from the cable yokes 24 to the attachments of the cables 25 to the brake rods 25c and 25d carried on the chassis, as shown in Figure 4. The brake rods 25c and 25d attach movably to arms projecting respectively below and above the rock shaft 25b which latter is supported in bearings attached to the chassis. A downwardly projecting arm 25e from the rock shaft 25b provides attachment for the brake rod 25a reaching forward to engage with the lower end of the emergency lever E, which latter fulcrums on a pivot usually supported by the customary transmission case of a motor vehicle. The combination of linkages and arm lengths, as described and indicated at Figure 4 is provided to function for maintaining a fixed relation between the positioning of the cams 21 in the wheel brake mechanisms and the positioning of the emergency brake lever E carried on the chassis. If the emergency brake lever moves to the extreme limit the attachments of the cable yokes 24 to the emergency brake lever will have coincidentally caused impingement of the yokes 24 against the bosses 27, which in turn prohibits further movement of the emergency brake lever, the yokes 24 and the cams 21, meantime the cams will have impelled the brake shoes to the extreme limit compatible with permissible wear of the brake shoe linings 6, which wear must always leave sufficient margin of brake lining material to act effectively when braking action is desired. Therefore, the maximum travel of the emergency brake lever E indicates that the brake linings must be renewed forthwith. Since no adjustments to compensate for wear are contemplated during the life of brake linings, the movement of the emergency brake lever provides means whereby faulty brakes, due to worn brake liners, can be anticipated and prevented. The achievement is definitely constructive in the interests of public safety. As already stated, it provides means that make official inspection of brakes a very simple matter, it being necessary for the inspector only to pull the emergency brake lever. Thus efficient inspection will eliminate the road hazard caused by willful or ignorant failure of careless drivers to voluntarily keep their car brakes in proper order.

Fluid pressure actuation of my wheel brake mechanisms is accomplished by created fluid pressure admitted into the brake cylinders 16, entering by way of the hose ports 20, the pipes 18 and the cylinder ports 16a (Figure 2), which pressure impels the pistons 15 and 15a and the thrust rods 14 and 14a to move the brake shoe levers 7 and 8 and thereby carry the attached brake shoes into contact with the brake drums 2. The secondary brake shoe levers 8 find anchorage to the brake housing 1 at the anchor bolt 9 to swing thereon and carry the attached secondary brake shoes 4 into contact with the brake drums where they will remain in fixed positions relative to the brake housings and exert direct radial pressures against the brake drums. Similarly, pressure in the cylinders 16 will motivate the primary sections 3 of the main brake shoes into contact with the brake drums 2, whereupon frictional drag will move the primary sections 3 rotatively to develop self energization in the manner already described. As has been stated, self energization reduces the pressure required in the cylinders 16 for any given braking action. Release of braking action is brought about by the power of the release spring 10 in compression between the brake shoe levers 7 and 8 as shown in Figure 1. Pressure having ceased in the cylinders 16, the secondary brake shoes levers 8 swing on the anchor bolts 9 to carry the attached secondary brake shoe 4 directly to rest position on the slotted rest boss 16b and the anchor bolts 9. The primary sections 3 of the main brake shoes first contact the rest boss 16c and the fulcrum pins 10a out of rest position in the direction of rotation of the brake drums. The power of the release spring 10 then acts through the brake shoe levers 7 to cause sliding on the slotted rest boss 16c until the primary sections 3 impinge against the cams 21 in final rest position, as shown in Figure 1. Simultaneously the intermediate sections 3a and the stationary sections 3b move to their rest positions and the springs 12c act to hold the stationary sections 3b in anti-rattle position seated on the secondary brake shoe levers as shown. The slots in the rest bosses 16b and 16c are athwart the web stiffeners of the brake shoes, as shown in Fig. 6, and are sufficiently high, as shown in Fig. 5, to prevent lateral movement with extreme radial movement of the brake shoes by reason of extreme wear of the brake linings 6.

The system illustrated in Figure 4 for creating fluid pressure to be admitted into the brake cylinder 16 is that described and illustrated in my pending application, Serial Number 698,672, filed November 18, 1933, and the reference figures shown in Figure 4 are the same and may be applied when reading that specification. A brief description of the functional workings of that system as used cooperatively with my present wheel brake invention is as follows: Pressure is created by the pump 60 and maintained at a predetermined amount in the pressure pipe 60p by the regulating valve 63 discharging excess pressure through the pipe 62 into the reservoir 66. The control valve 30 modulates the maintained pressure to any desired amount and from the control valve pressure reaches all of the brake cylinders 16 by way of the branch line pipes 20b and 20c carried on the chassis and thence through the flexible hose 20a communicating between the branch line pipes and the hose ports 20 in the brake housings 1. In release action, fluid discharges from the control valve 30 through the pipe 64 back to the reservoir, or through the pipe 67 to the pump 60.

It will be apparent that the unlimited follow up of pressure in the brake cylinder 16, as created by the engine driven pump 60, forces the brake shoes against the brake drums to any limit of wear. The safe limit of wear is defined by the travel of the emergency brake lever E. If the brake shoes are forced beyond the safe limit of wear the emergency braking system will refuse to function, as has been stated, which will soon bring the car to the attention of the police. It will also be apparent that the unlimited follow up of pressure makes adjustment of brakes unnecessary during the life of the long-service brake linings of the full circle evenly worn type described.

The various advantages resulting from my invention will be apparent to those skilled in the art, to whom may occur obvious modifications in design for various purposes and such modifications are to be considered within the scope of my invention if within the limits of the appended claims.

What I claim as my invention and desire to secure by Letters Patent is:—

1. In a braking system as described, a brake drum, a cam, a brake cylinder adjacent to the cam and having pistons therein, brake shoes, brake shoe levers having operably attached thereto the brake shoes, a release spring in compression and located oppositely to the center of the brake drum from the cam and brake cylinder, the cam adapted to impel the brake shoes into contact with the brake drum, the pistons adapted to impel the brake shoes into contact with the brake drum and the release spring acting between the opposite ends of the brake shoe levers from the attached brake shoes whereby the brake shoes are drawn away from contact with the brake drum.

2. In a braking system as described, brake drums, cams, brake cylinders adjacent to the cams and having pistons therein, brake shoes, brake shoe levers having operably attached thereto the brake shoes, release springs in compression and located oppositely to the centers of the brake drums from the cams and brake cylinders, the cams adapted to impel the brake shoes into contact with the brake drums, the pistons adapted to impel the brake shoes into contact with the brake drums, and the release springs acting between opposite ends of the braek shoe levers from the attached brake shoes whereby the brake shoes are drawn away from contact with the brake drums.

3. Brake mechanisms as set forth in claim 2 mounted on axles supporting the chassis of a motor vehicle, fluid pressure creating means carried by the chassis, communicating means from the fluid pressure creating means to the cylinders whereby the pistons are actuated at all wheel mechanisms, an emergency brake lever carried by the chassis, mechanical attachments between the emergency brake lever and the cams at all wheel brake mechanisms whereby movement of the emergency brake lever provides a measure of the wear from no wear to full wear without adjustments caused by the pistons acting to impel the brake shoes into contact with the brake drums.

4. In a braking system as described, a brake drum, a brake housing, a brake shoe lever swinging on a fulcrum movably supported by the brake housing, a second brake shoe lever swinging on a fulcrum immovably supported by the brake housing, brake shoes operatively attached to the ends of the brake shoe levers, a release spring in compression between the ends of the brake shoe levers opposite to the attached brake shoes and means to move the attached brake shoes against the resistance of the compressed release spring into contact with the brake drum.

5. Apparatus as set forth in claim 4 mounted on axles supporting the chassis of a motor vehicle and including cams rotated by cables from the said brake housings to an emergency brake lever carried by the chassis and cylinders with pistons therein motivated by pressure from a pressure creating means acting independently to move the said brake shoes into contact with the said brake drums of all apparatus mounted on the said axles, whereby movement of the emergency brake lever provides a measure of the wear from no wear to full wear without adjustments caused by said pressure creating means acting to move the said brake shoes into contact with the said brake drums.

6. In a braking system as described, a brake housing, a brake drum, brake shoes, brake shoe levers, a release spring, the brake shoe levers fulcrumed to the brake housing and having the brake shoes operably attached at the ends of each lever and the release spring in compression between ends of the said levers opposite from the attached brake shoes whereby the brake shoes are held away from contact with the brake drum and means to force the brake shoes against the resistance of the release spring into contact with the brake drum.

7. Apparatus as set forth in claim 6, the said means comprising a cylinder having pistons operably positioned therein to impel the brake shoes into contact with the brake drum.

8. Apparatus as set forth in claim 6, the said means comprising a cam operably positioned to impel the brake shoes into contact with the brake drum.

9. In a braking system as described, a brake drum, a brake housing, a main brake shoe comprising a primary section flexibly attached to an intermediate section flexibly attached to a stationary section in the sequence stated to enable conformation to the circularity of the brake drum, the stationary section operably anchored relative to the brake housing to cause tangential reaction to pressure transmitted through the intermediate section from the primary section by reason of frictional drag whereby componental pressure results acting in a radial direction on the intermediate section to cause increased pressure of the intermediate section against the brake drum.

10. In a braking system as described, a brake drum, a brake housing, a main brake shoe, a secondary brake shoe, a secondary brake shoe lever pivotally anchored to the brake housing, a strut, the secondary brake shoe operably attached to the secondary brake shoe lever, the main brake shoe operably attached to the strut and the strut pivotally anchored to the secondary brake shoe lever, whereby frictional drag resulting from the brake drum acting on the main brake shoe causes tangential thrust from the main brake shoe to be transmitted through the strut to the secondary brake shoe lever in a manner to cause radial pressure to be exerted on the said attached secondary brake shoe and resisted by impingement on the brake drum.

11. A braking system comprising axles supported by wheels, a chassis supported by the axles, brake drums attached to all of the wheels, brake housings attached to the axles, brake shoes attached to the housings, a fluid pressure creating means carried on the chassis, cylinders having therein pistons adapted for motivation by fluid pressure to impel the brake shoes into braking contact with all the brake drums, branch line pipes communicating from the fluid pressure creating means to the cylinders, an emergency brake lever carried by the chassis, mechanical means having a movement limiting means adapted for motivation by the emergency brake lever to impel the brake shoes to the extreme permissible wear of the brake linings compatible with safety and not further into contact with all the brake drums under all conditions from no wear to full permissible wear without adjustments, the mechanical means and the pistons acting independently of each other whereby movement of the emergency brake lever provides a measure of the brake shoe wear within permissible limits and not further caused by the fluid pressure creating means motivating the pistons, whereby faulty brakes can be anticipated and prevented.

12. A wheel brake mechanism comprising a brake drum, a back plate, a main brake shoe sequence composed of a primary section flexibly attached to an intermediate section flexibly attached to a stationary section in the order named to enable conformation of the aforesaid sequence of sections to the circularity of the brake drum, a strut, a secondary brake shoe, a secondary brake shoe lever and having thereto operably attached the secondary brake shoe, the strut operably attached to the stationary section of the said sequence and positioned to cause radial pressure against the brake drum by reason of resisting tangential pressure from the main brake shoe acting in sequence against the strut, the secondary brake shoe lever anchored pivotally to the back plate and providing anchorage for the strut whereby complementary component pressure is transmitted through the strut from the said stationary section to the secondary brake shoe lever adapted to convert pressure from the strut into radial pressure against the attached brake shoe.

13. A braking system comprising axles supported by wheels, a chassis supported by the axles, brake drums attached to the wheels, back plates attached to the axles, brake shoes attached to the back plates, fluid pressure creating means carried by the chassis, cylinders having within pistons adapted for motivation by the fluid pressure creating means to impel the brake shoes into braking contact with the drake drums, branch line pipes communicating from the fluid pressure creating means to the cylinders, cam mechanisms adapted for limited movements to impel all the brake shoes into contact with all the brake drums to the extreme permissible wear of the brake linings compatible with safety and not further, an emergency brake lever carried by the chassis, means providing attachments between the emergency brake lever and the said cam mechanisms, the cam mechanisms and the pistons acting independently of each other whereby the coincident limited movement of the emergency brake lever attached to the said mechanical means provides indication of the brake shoe wear within permissible limits caused by the motivation of the pistons as described.

J. EUGENE WALLACE.